United States Patent
Robinson et al.

(10) Patent No.: US 9,279,724 B2
(45) Date of Patent: Mar. 8, 2016

(54) IMAGING SPECTROMETER WITH EXTENDED RESOLUTION

(71) Applicant: RAYTHEON COMPANY, Waltham, MA (US)

(72) Inventors: Ian S. Robinson, Redondo Beach, CA (US); John D. Bloomer, Redondo Beach, CA (US); Bradley Flanders, Whittier, CA (US)

(73) Assignee: RAYTHEON COMPANY, Waltham, MA (US)

( * ) Notice: Subject to any disclaimer, the term of this patent is extended or adjusted under 35 U.S.C. 154(b) by 85 days.

(21) Appl. No.: 14/312,740

(22) Filed: Jun. 24, 2014

(65) Prior Publication Data

US 2015/0369667 A1 Dec. 24, 2015

(51) Int. Cl.
*G01J 3/45* (2006.01)
*G01J 3/453* (2006.01)
*G01J 3/02* (2006.01)
*G01J 3/06* (2006.01)

(52) U.S. Cl.
CPC ............ *G01J 3/4535* (2013.01); *G01J 3/0202* (2013.01); *G01J 3/06* (2013.01); *G01J 2003/4538* (2013.01)

(58) Field of Classification Search
CPC ... G01B 9/02044; G01B 9/02084; G01J 3/02; G01J 3/45
USPC ................................ 356/452, 498
See application file for complete search history.

(56) References Cited

U.S. PATENT DOCUMENTS

| 8,203,715 B2 | 6/2012 | Robinson |
| 2005/0237535 A1* | 10/2005 | Deck ................. G01B 11/2441 356/497 |
| 2010/0049470 A1* | 2/2010 | Szajnowski ............... G01S 7/35 702/159 |
| 2010/0290053 A1 | 11/2010 | Robinson |

FOREIGN PATENT DOCUMENTS

WO    2014190027 A1    11/2014

OTHER PUBLICATIONS

Korenberg et al., "Raman Spectral Estimation via First Orthogonal Search", Analyst, London, GB, vol. 122, Sep. 1, 1997, p. 880, Column, Paragraph 1, 3.

* cited by examiner

*Primary Examiner* — Jonathan Hansen
(74) *Attorney, Agent, or Firm* — Lando & Anastasi, LLP

(57) ABSTRACT

Interferometric transform spectrometer (ITS) systems and methods of operation thereof. In one example, an ITS system includes a Michelson interferometer that introduces a varying optical path length difference (OPD) between its two arms so as to produce an interferogram, a detector that receives and samples the interferogram, and a scan controller coupled to the detector and to Michelson interferometer. The scan controller controls the Michelson interferometer to vary the OPD in discrete steps such that the detector provides M samples of the interferogram for each of two scan segments. In the first scan segment, the M samples have a uniform or non-uniform sample spacing and the OPD has a first maximum value. In the second scan segment, the M samples have an incrementally increasing sample spacing and the OPD has a second maximum value that is at least twice the first maximum value.

17 Claims, 12 Drawing Sheets

IMAGING SPECTROMETER WITH EXTENDED RESOLUTION

BACKGROUND

Imaging spectroscopy is widely used in remote sensing applications. One type of interferometric spectrometer used to supply spectral data for many remote sensing applications is called a Fourier Transform Spectrometer (FTS). A common form of an FTS employs a Michelson interferometer with one arm having a variable optical path length. The variable optical path length may be implemented using a movable minor. By scanning the movable mirror over some distance, an interference pattern or interferogram is produced at the imaging sensor (e.g., a focal plane array) that encodes the spectrum of the source (the amplitude of each incident spectral wavelength, or frequency, or wavenumber, is encoded as the amplitude of a cosine signal of given frequency). An FTS with a maximum optical path length difference (OPD) between the two arms of L centimeters (cm) provides a spectral resolution of $1/(2L)$ cm$^{-1}$. The FTS uses the Discrete Fourier Transform (DFT) or its faster algorithm, the Fast Fourier Transform (FFT), to convert the auto-correlation to physical spectra. The encoded spectrum is the Fourier transform of the source. The FFT is efficient when large sample sets must be processed, but produces artifacts if the variable arm is not precisely controlled to provide uniformly spaced samples. The FTS also requires that the entire spectrum be computed at once, despite the fact that most spectral targets can be detected using only a few spectral samples or subsets of the spectrum. The DFT and FFT have limited spectral range due to aliasing effects, and once the band center is set in one part of the spectrum it cannot be modified elsewhere without recomputing the entire transform.

Commonly-owned U.S. Pat. No. 8,203,715 titled "KNOWLEDGE BASED SPECTROMETER," which is herein incorporated by reference in its entirety, discloses an alternate configuration of an interferometric transform spectrometer that does not rely on DFT/FFT-based processing, and therefore can accommodate non-uniformly spaced samples. More specifically, U.S. Pat. No. 8,203,715 discloses a system in which the variable optical path length in one arm of the interferometer may introduce a maximum OPD of L (similar to the conventional FTS), but where knowledge of the "uncontrolled" sample step size and an alternative algorithm to the DFT/FFT is used to process the collected data.

SUMMARY OF INVENTION

Aspects and embodiments are directed to an imaging interferometric transform spectrometer (ITS) capable of providing enhanced spectral resolution, compared to a conventional FTS, for a given number of samples or collection time for a given focal plane array (FPA).

According to one embodiment, an interferometric transform spectrometer system comprises a Michelson interferometer configured to introduce a varying optical path length difference (OPD) between two arms of the Michelson interferometer so as to produce an interferogram, a detector positioned at a focal plane of the Michelson interferometer and configured to receive and sample the interferogram, and a scan controller coupled to the detector and to Michelson interferometer and configured to control the Michelson interferometer to vary the OPD in discrete steps such that the detector provides, for each of a first and second scan segment, M samples of the interferogram, wherein for the first scan segment, the M samples have a uniform or non-uniform sample spacing and the OPD has a first maximum value, and for the second scan segment, the M samples have an incrementally increasing sample spacing and the OPD has a second maximum value that is at least twice the first maximum value.

In one example, the interferometric transform spectrometer further comprises a Lomb estimator coupled to the scan controller and to the detector, the Lomb estimator configured to receive and process, for each of the first and second scan segments, the M samples from the detector. The Lomb estimator may be configured to estimate a signal amplitude for each of a plurality of cosinusoids that are fit to the M samples from the first scan segment, and to provide a control signal to the scan controller to direct the scan controller to begin the second scan segment responsive to the signal amplitude of at least one cosinusoid being above a threshold value. In one example, the scan controller is configured to receive information containing the threshold value from a user of the system, and to provide a signal specifying the threshold value to the Lomb estimator. In another example, the control signal provided from the Lomb estimator to the scan controller further specifies a frequency range to be reconstructed from the M samples collected during the second scan segment, the frequency range including a frequency associated with at least one reconstructed signal derived from the first scan segment. In one example, the Michelson interferometer includes a fixed mirror positioned in a first arm of the two arms, a movable mirror in a second arm of the two arms, a beamsplitter configured to split and direct incident radiation into the two arms, and to recombine reflected radiation from the two arms and provide reflected radiation to the detector, and an actuator coupled to the movable minor and to the scan controller, and configured to move the movable minor along an axis of the second arm so as to produce the varying OPD responsive to an actuation signal from the scan controller.

Another embodiment is directed to a method of spectral imaging using an interferometric transform spectrometer (ITS). The method may comprise acts of controlling the ITS to collect M first samples of an interferogram produced by the ITS over a first frequency range and first optical path difference of the ITS, M being a positive integer, processing at least some of the M first samples to produce corresponding first spectra, analyzing the first spectra to determine a presence or absence of a signal of interest, responsive to detecting the signal of interest, controlling the ITS to collect M second samples of the interferogram over a second optical path difference of the ITS, the M second samples having an incrementally increasing sample spacing, and processing the M second samples to produce corresponding second spectra.

In one example of the method, the M first samples have a uniform sample spacing. The ITS may include a Michelson interferometer, wherein controlling the ITS to collect the M first samples includes controlling the Michelson interferometer to vary the optical path difference between two arms of the Michelson interferometer in uniform steps. In one example, processing at least some of the M first samples includes applying DFT/FFT processing to the M first samples to produce the first spectra. In another example, controlling the ITS to collect the M first samples includes varying the optical path difference between the two arms of the Michelson interferometer over a first range from a minimum optical path difference value to a first maximum optical path difference value, and controlling the ITS to collect the M second samples includes controlling the Michelson interferometer to vary the optical path difference between the two arms of the Michelson in incrementally increasing steps over a second range from the minimum optical path difference value to a second maximum optical path difference value, the second maximum optical path difference value being at least twice the first maximum optical path difference value. In one example, the second maximum optical path difference value is approximately four times the first maximum optical path difference value.

In another example, the first M samples have a non-uniform sample spacing. The ITS may include a Michelson interferometer having a movable minor configured to provide a varying optical path difference between two arms of the Michelson interferometer, wherein controlling the ITS to collect the M first samples includes moving the movable minor along an axis of a respective arm of the Michelson interferometer, and wherein processing at least some of the M first samples includes determining a position of the movable mirror, and performing a series of cosine estimations on the at least some of the M first samples, using knowledge of the position of the movable minor, to estimate a signal amplitude fit to at least some of the M first samples. In one example, controlling the ITS to collect the M first samples includes varying the optical path difference between the two arms of the Michelson interferometer over a first range from a minimum optical path difference value to a first maximum optical path difference value, and controlling the ITS to collect the M second samples includes controlling the Michelson interferometer to vary the optical path difference between the two arms of the Michelson in incrementally increasing steps over a second range from the minimum optical path difference value to a second maximum optical path difference value, the second maximum optical path difference value being at least twice the first maximum optical path difference value. In one example, the second maximum optical path difference value is approximately four times the first maximum optical path difference value.

In another example, processing at least some of the M first samples includes using a Lomb estimator to estimate initial signal amplitudes of each of a plurality of cosinusoids that are fit to the M first samples, and wherein analyzing the first spectra includes determining whether the signal amplitude of at least one of the cosinusoids exceeds a threshold value.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

There is a strong need for low-cost imaging spectrometers operating in the longwave infrared (LWIR) spectral band. Low cost can be achieved using interferometric transform spectrometers (ITSs) employing uncooled microbolometer focal plane arrays (FPAs) and solid state (e.g., piezoelectric) actuators to move mirrors within the interferometer to create the optical path difference (OPD). However, there are obstacles associated with this configuration. In particular, uncooled microbolometer FPAs have relatively slow frame rates, for example approximately 30-60 Hz, and piezoelectric actuators do not provide precise position control. Aspects and embodiments are directed to providing spectra from an ITS while collecting a minimum number of samples (frames) for a given spectral resolution, and optionally providing the ability to accommodate non-uniform (or not precisely controlled) sample spacing. Minimizing sample (frame) count may be important as the ITS may operate most effectively if the target scene is stationary, and therefore minimizing the observation (data collection) time may be important to ensure that this is the case. Reducing the number of data samples may also be advantageous in that it may simplify the FPA and electronics capability and/or reduce the cost of these components. Aspects and embodiments provide enhanced spectral resolution compared to conventional transform spectrometers for a given number of data samples, or for a given data collection time. As discussed in more detail below, certain embodiments may provide a spectral resolution improvement of at least a factor of two, for a given number of data samples, or the same data collection time.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
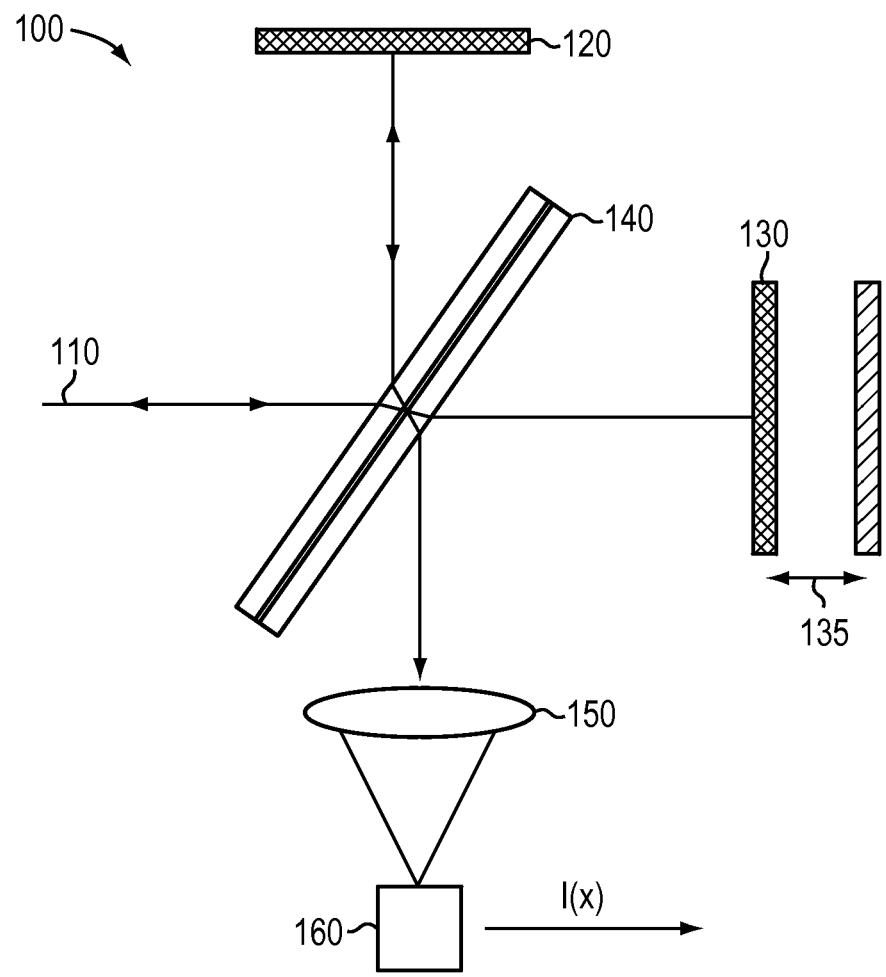
FIG. 1 is a block diagram of one example of an interferometric transform spectrometer according to aspects of the invention.

Referring to FIG. 1, there is illustrated a block diagram of one example of an ITS according to one embodiment. The ITS 100 comprises a Michelson interferometer that splits the incoming beam 110 of electromagnetic radiation into two waves, introduces an optical path difference between the two waves, recombines the waves, and measures the interference function, I(x). In the illustrated example, the Michelson interferometer includes a fixed minor 120 positioned in a first arm/path of the interferometer, and a movable mirror 130 positioned in a second arm/path of the interferometer. A beamsplitter 140 splits the incoming beam 110 into the two paths. The movable mirror 130 is movable along the axis of the arm, as indicated by arrow 135, over a total distance of L. Movement of the movable minor 130 introduces the optical path difference between the two arms of the interferometer. Focusing optics 150 focuses the recombined electromagnetic radiation onto a detector 160 that measures the interference function I(x). The detector 160 may be a focal plane array, such as a microbolometer FPA, for example. The FPA can include a set of photo-detector elements and corresponding electronics arranged at or near the focus of the interference pattern. For example, the set of photo-detectors elements can be arranged as a linear array or in a two-dimensional matrix. The detector 160 provides an output corresponding to I(x).

When the incoming beam 110 is composed of monochromatic input light of wavelength λ or wavenumber ν (ν=1/λ), the recombination of the two waves leads to an interference effect, as discussed above. The amplitude A of the output wave depends on the phase difference α between the two waves, which in turn depends on the instantaneous OPD, x. This is shown in Equation (1):

$$A = 2\alpha \cos \pi \nu x \quad (1)$$

The light intensity, I(x), is proportional to the square of the amplitude, as shown in Equation (2):

$$I(x) = 2\alpha^2 (1 + \cos 2\pi \nu x) \quad (2)$$

Considering a continuous spectrum, rather than a single monochromatic wave, the intensity of the interferogram produced at the detector 160, I(x), can be expressed as a function of the OPD, x, using Equation (3):

$$I(x) = \tfrac{1}{2} \int_{-\infty}^{\infty} S(\nu)(1 + \cos 2\pi \nu x) d\nu \quad (3)$$

Thus, the spectral data of interest may be encoded in superposition of cosinusoids of many frequencies. The amplitude of each cosinusoid corresponds to the power in a spectral element. The transform of I(x) gives the spectrum of the incoming beam 110.

For all interferometers, the maximum achievable spectral resolution is proportional to the maximum OPD. A conventional FTS with a maximum OPD of L centimeters (cm) provides a spectral resolution of $1/(2L)$ cm$^{-1}$. If the FTS uses a sample spacing Δ=L/M, then to avoid aliasing and other artifacts, the instrument must collect 2M samples uniformly spaced in OPD. In a conventional FTS, the spectral resolution is intrinsically coupled to the number of samples or FPA frames (which can equal data collection time). As discussed in more detail below, aspects and embodiments provide a method of sampling and processing the data to extend the OPD with fewer samples and no aliasing. In particular, unlike conventional spectrometers in which the spectral resolution per sample is limited by the maximum OPD and aliasing constraints, certain embodiments avoid or defeat aliasing and decouple the maximum OPD from sampling constraints. According to certain aspects and embodiments, sampling is performed in two phases or parts, with the first phase being used to establish the general location (in the spectrum) of spectral features of interest, and the second phase being used to obtain enhanced resolution in those regions. In one embodiment, a >2X improvement in spectral resolution may be obtained by performing such a two part (or two phase) sampling scan wherein the first phase uses either conventional FTS processing or the processing techniques discussed in U.S. Pat. No. 8,203,715, and the second part employs a particular non-uniform sampling method in which the samples are incrementally spaced.

Figure 2:
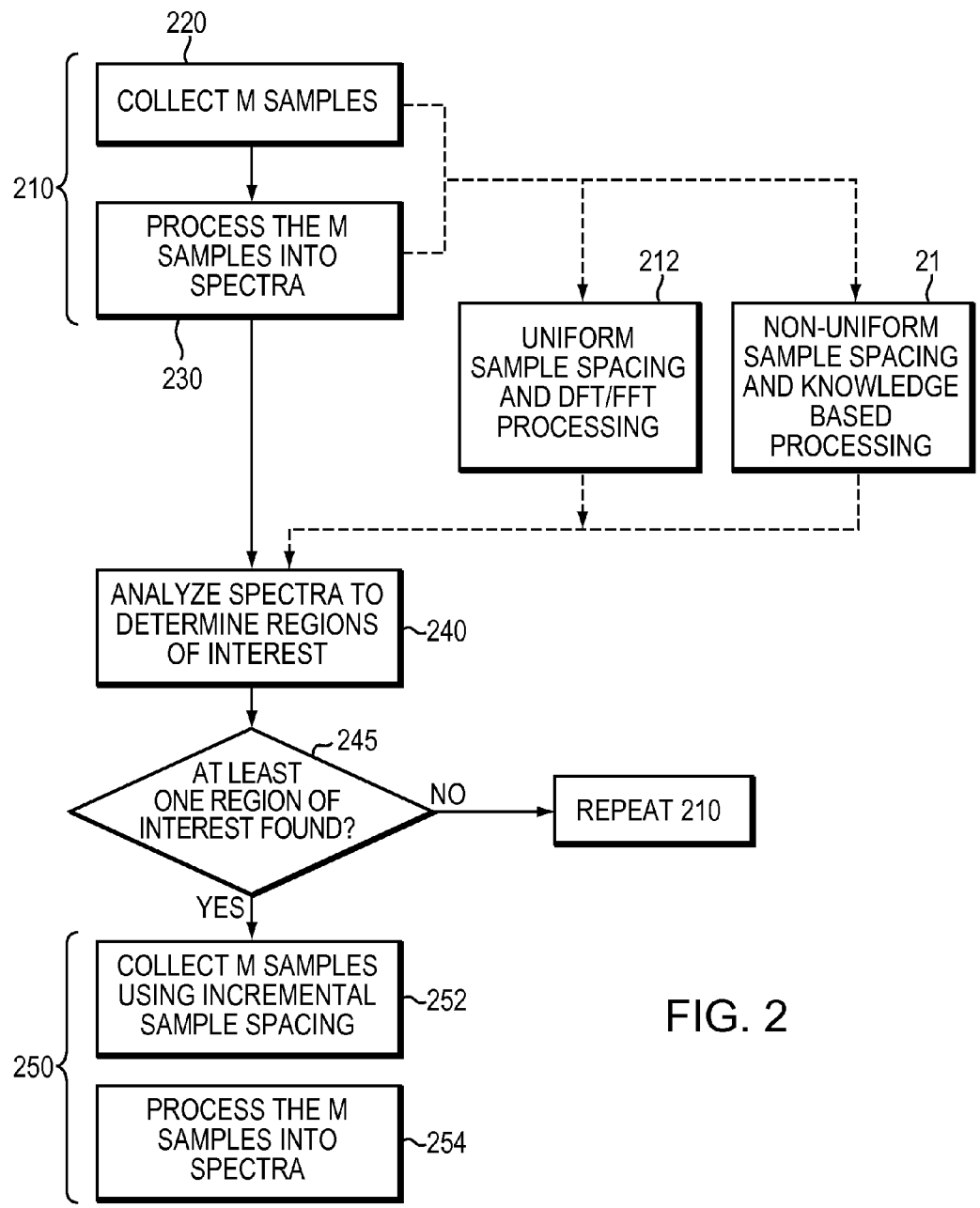
FIG. 2 is a flow diagram illustrating one example of a method of operating an interferometric transform spectrometer according to aspects of the invention.

Referring to FIG. 2, there is illustrated a flow diagram of one example of a method of operating an ITS according to certain embodiments. As discussed above, the scan is taken in two parts. The first part of the scan 210 may include collecting M samples, M being a positive integer (step 220), and processing the M samples into spectra (step 230). In one example, the M samples may be close to uniformly spaced; that is, they may be exactly uniformly spaced, or may have a randomly varying spacing. In the second part of the scan another M samples are collected. In one example, the maximum OPD of the ITS used to collect the samples is L, and therefore the average sampling spacing is L/2M. As discussed above, the first part of the scan 210 may be performed using FTS (DFT/FFT based) sampling and processing (step 212), or using knowledge based sampling and processing (step 214).

Figure 3A:
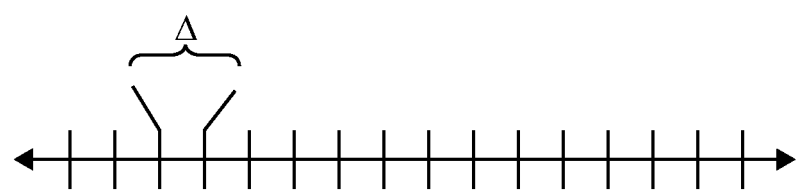
FIG. 3A is a diagram of one example of notional uniform sampling spacing.
Figure 3B:
FIG. 3B is a diagram another example of notional non-uniform sampling spacing.

FIG. 3A illustrates an example of notional sampling spacing using an FTS configuration for the first part of the scan 210. In this example, the maximum OPD is L, and the sampling spacing, A, is constant and controlled at L/2M. The DFT/FFT is used to estimate the cosinusoids making up I(x), as discussed above. The DFT/FFT computes the amplitudes of M cosinusoids when M samples are taken. FIG. 3B illustrates an example of the notional sampling spacing using the alternate knowledge based sampling and processing procedures disclosed in U.S. Pat. No. 8,203,715 for the first part of the scan 210. In this example, the maximum OPD is L, and the sampling spacing, A, is potentially variable and need not be precisely controlled, but is carefully measured, and averages approximately L/2M. The amplitudes of the cosinusoids in this example may be estimated only at frequencies of interest using an estimation technique, such as a least squares approximation.

Figure 4:
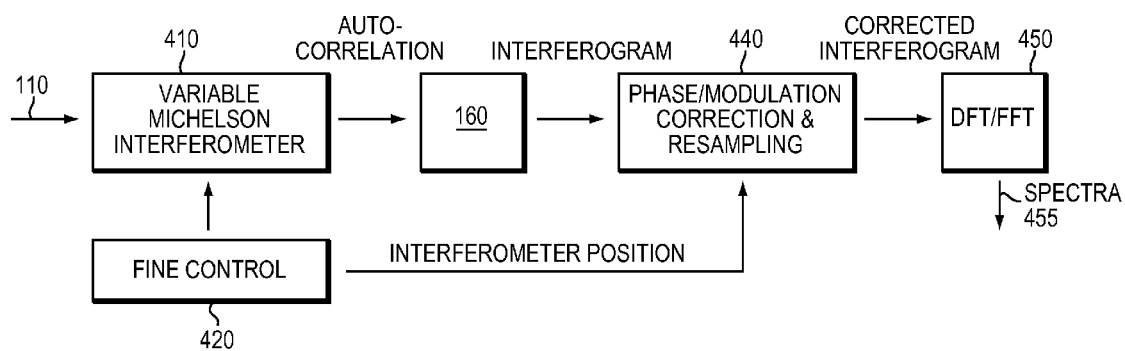
FIG. 4 is a block diagram of one example of a portion of an interferometric transform spectrometer according to aspects of the invention.

FIG. 4 is a functional block diagram of one example of an ITS configured to use conventional FTS sampling and processing for the first part of the scan 210 (step 212). The electromagnetic radiation 110 enters the sensor system 400 and is transmitted via optics (not shown) to an interferometer 410, such as the Michelson interferometer of FIG. 1. As discussed above in relation to FIG. 1, the electromagnetic radiation 110 is split into two segments, which are recombined. One arm of the interferometer introduces a varying OPD. A fine control module 420 ensures the OPD is varied in uniform steps, of size A, at each time sample. Signals are collected by the detector 160, which provides M digital samples of the interferogram produced at the detector. The digital data may be preprocessed by a phase/modulation correction and resampling module 440 to ensure no data is missing or contains spikes. Variations in gain/modulation or offset of the sensor may be corrected to the best degree possible. The data may be re-sampled to ensure that they are optimally aligned in phase and time. The re-sampled corrected data are typically windowed (apodized) and sent to a DFT/FFT module 450 that is encoded with the DFT/FFT algorithm that produces spectra 455.

In one example, the fine control module 420 includes a laser reference that is passed through the interferometer 410. The reference employs a wavelength well away from the spectral range being measured, and may even be detected on a unique detector (not shown). The fringe count of the reference is used to measure the OPD. A reference can also be employed to measure the tilt of the optics in the interferometer.

As discussed above, the spectra are computed across the entire spectral range on a uniform grid of wavelength samples (which may or may not be centered on the physical features of interest). The DFT/FFT introduces an Instrument Line Shape (ILS) that is dominantly the Fourier Transform of the apodization shape applied. The ILS defines the band shape and band center of each spectral element. Common apodization functions include the triangular function and the three Norton-Beer functions. The ILS may also be impacted by a number of phenomena including re-sampling errors, jitter in the interferometer that causes sample errors and/or tilting of optical elements, and by differences in the interferometer settings during the motion of the minor in the two respective directions. Accordingly, the system may be configured to use timing data and/or perform some spectral calibration to account for errors in the ILS.

Figure 5:
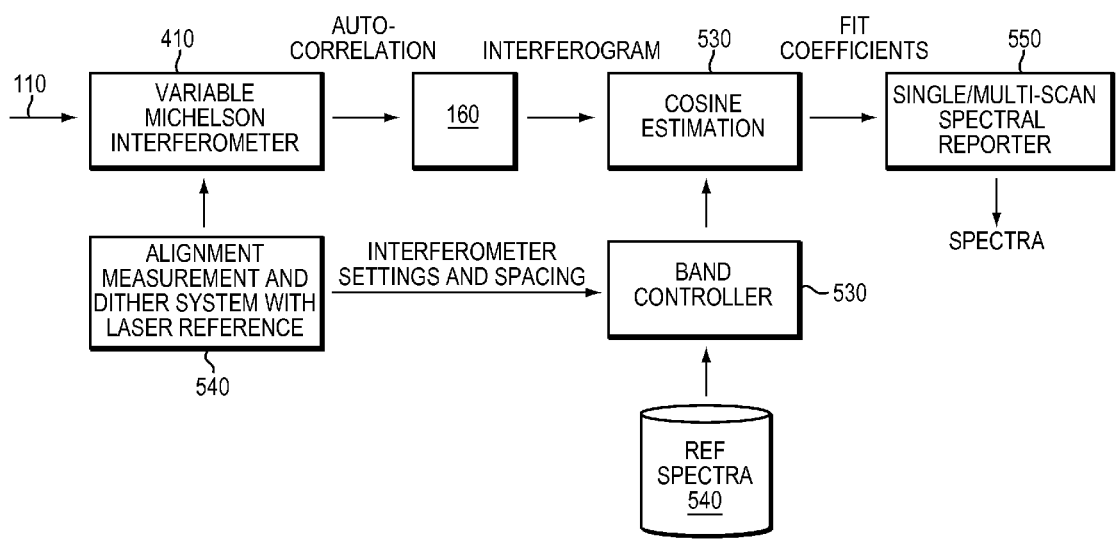
FIG. 5 is a block diagram of another example of a portion of an interferometric transform spectrometer according to aspects of the invention.

According to another embodiment, the first part of the scan 210 is perform using knowledge based sampling and processing (step 214), such that the M samples need not be perfectly uniformly spaced. FIG. 5 is a functional block diagram of one example of an ITS configured to use dynamic knowledge of the interferometer sampling and settings along with signal processing to match spectral features directly in the interferogram. The system includes an alignment measurement and dither system with a laser reference module 510, a band controller module 520, a cosine estimation module 530, a reference spectra database 540, and a single/multi-scan spectral reporter module 550. The OPD and (optionally) the tilt of the interferometer are measured by the alignment measurement and dither system 510. The measured OPD (and if measured, the tilt) of the interferometer is then transmitted to the band control module 520. The band control module 520 uses the information on the position of the interferometer to select the centers of samples that will be used in the cosine estimation module 530. The tilt of the optics and/or the modulation of the interferogram are measured and sent to the band control module 520. The band control module 520 computes an ILS according to the tilt, modulation, and jitter as measured in the system.

A series of cosine estimations is performed by the cosine estimation module 530 in the neighborhood of the reference's wavelength to empirically assess the ILS and any unexpected spreading of the monochromatic signal. The estimations also indicate the creation of any secondary signals, such as harmonics, ghosts, etc. In one mode, the modulation is corrected using conventional techniques. In another mode, the interferogram is inversely re-modulated using the moving window modulation. These two techniques can be combined in series.

The band control module 520 is configured to read spectral data from a spectral reference database 320. The reference spectra are convolved with either the predicted ILS or the computed ILS. The output of the convolution is used by the band control module to select band centers for cosine estimation. These band centers may be anywhere in the spectral range of the sensor. This is useful for deconvolving the ILS and for centroiding measured features.

After the band centers have been selected, the cosine estimation (CE) module 530 is configured to use one of a family of techniques to estimate the amplitude of the cosinusoid at that frequency. The techniques may include a linear or non-linear least-squares analysis and digital heterodyning. In the digital heterodyning technique, two orthogonal cosines that are 90 degrees out of phase are multiplied with the measured interferogram samples. The products are essentially correlation coefficients and are, in turn, added in quadrature to complete the estimate of the amplitude. In this approach, the cosinusoids are compared at the known (measured) OPD sample spacing. Thus, only knowledge, rather than control, of the sampling is needed.

Certain embodiments may include the joint estimation of two or more cosinusoids at one time. The band control module 520 may be configured to select two or more band centers to transmit to the CE module 530 along with a constraint on their relative amplitude(s). The CE module 530 may find the optimal estimate of amplitudes at each band center subject to the constraint. Additionally, in certain embodiments, the interferometer is configured to dither the position to ensure that the samples are not equally spaced in OPD. This sampling scheme improves the free spectral range or reduces the number of samples required to avoid aliasing. The dither system may be configured to deliberately provide unique sample spacing on a series of scans. The spectral reporter module 550 is configured to combine data from multiple scans and refine the estimates of amplitude.

Referring again to FIG. 2, after at least some of the spectra are obtained, using either step 212 or 214, the spectra are analyzed (step 240), and if a signal of interest is found (decision block 245) at any spectral location(s), the scan and sampling proceed to the second part of the scan 250. The second part of the scan 250 may be focused on the spectral region(s) where the signals of interest were located. As discussed above, if conventional DFT/FFT processing is used for the first part of the scan 210 it may be necessary to complete step 212 before the spectra can be analyzed in step 240. Alternatively, if knowledge-based processing is used (step 214), the analysis step 240 may begin during step 214. According to one embodiment, the second part of the scan 250 increases the OPD to 2L or greater. The M samples collected during the second phase of the scan are taken with incremental spacing (step 252), with the sample spacing varying from fine spacing at the beginning of the second part of the scan, to more coarse spacing towards the end of the second part of the scan. The average sample spacing may be less than or equal to L/M. In one example, the average sample spacing is about 1.5L/2M, with the finest spacing being 1.5L/4M, and the coarsest spacing being 4.5L/4M.

Figure 6:
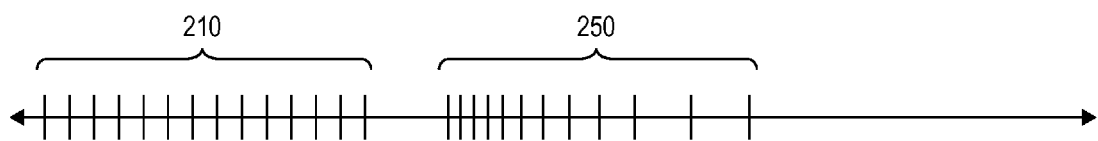
FIG. 6 is a diagram of one example of notional sample spacing for a two-part scan according to aspects of the invention.

FIG. 6 illustrates an example of the notional sampling spacing for one embodiment of a two part scan. In the illustrated example, non-uniform spacing is used in the first part of the scan 210 (e.g., step 212), followed by incremental spacing in the second part of the scan 250.

The incremental sampling used in the second part of the scan may introduce small artifacts into the spectra obtained from the M samples. Absent other information, these artifacts may falsely indicate the presence of signals of interest at certain spectral locations. According to one embodiment, step 240 of analyzing the spectral obtained in the first part of the scan 210 includes defining a threshold for the signal intensity, I(x), with spectral regions of interest being selected as those regions at which I(x) exceeds the threshold. In the second part of the scan 250, at spectral locations where the signals from the first part of the scan 210 are above the threshold, the samples are further converted to higher resolution using a Lomb periodogram or normalized Lomb periodogram. Thus, the enhanced resolution obtained using the incremental sampling and Lomb-based processing may be applied only at those spectral regions where the conventional sampling and processing used in the first part of the scan 210 has already indicated that there is a signal of interest. Using this approach, where the second phase sampling processing is directed to spectral regions where there are unambiguous features present, effects of the potentially confusing artifacts produced during this second phase sampling and processing may be mitigated. In step 254 the collected spectra are analyzed in accord with the application of the interferometer (e.g., to determine a spectral signature of received electromagnetic radiation 110, or to look for specific spectral features associated with known compounds, for example).

Figure 7:
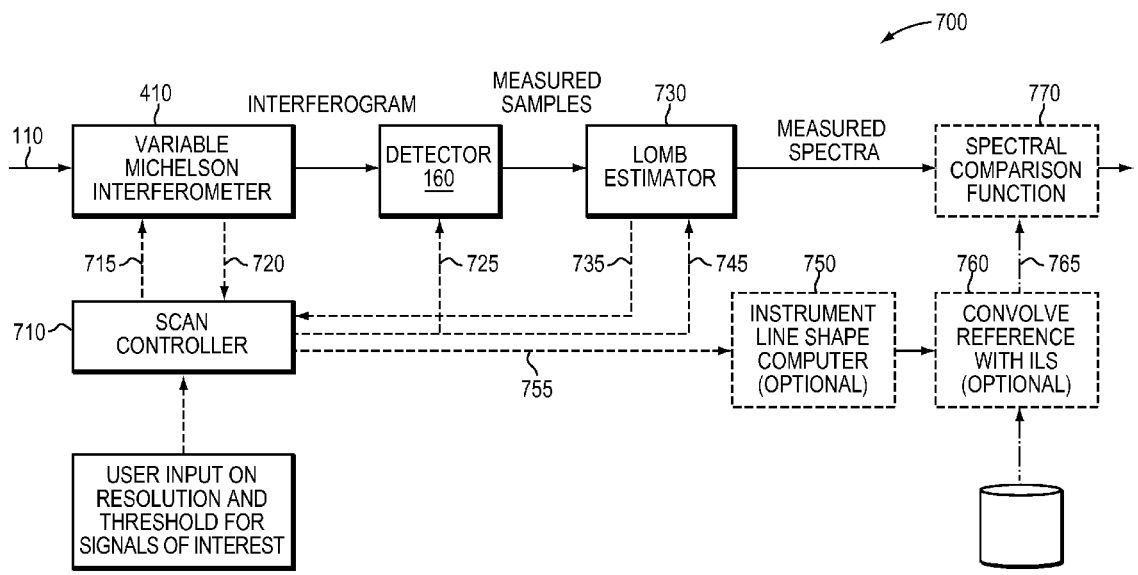
FIG. 7 is a block diagram of one example of an interferometric transform spectrometer according to aspects of the invention.

Referring to FIG. 7, there is illustrated a functional block diagram of one example of a system 700 configured to implement the two-part sampling and processing discussed above. Electromagnetic radiation 110 enters the sensor system 700 and is transmitted via optics (not shown) to an interferometer 410, such as the Michelson interferometer of FIG. 1. As discussed above in relation to FIG. 1, the electromagnetic radiation 110 is split into two segments, which are recombined. One arm of the interferometer 410 introduces a varying OPD, such that interferograms are swept out at the detector 160, as discussed above. As scan controller 710 provides a control signal 715 to the interferometer 410 to control the movable minor 130 (see FIG. 1) to vary the OPD in discrete steps, with either uniform, random non-uniform, or incremental spacing A, at each time sample, depending on the phase of the scan being performed. The scan controller 710 may further receive a position signal 720 from the interferometer 410 which may be used to implement the knowledge-based processing of step 214 discussed above. In one example, the position signal 720 is provided by a piezoelectric or other actuator associated with the movable minor 130. Signals are collected by the detector 160, which provides M digital samples of the interferogram produced at the detector, as discussed above. The scan controller 710 may provide a clock signal 725 to the detector 160 to capture the M samples from the detector at discrete sample time points.

The M samples from the detector 160 may be input to a Lomb estimator 730, which accumulates the samples, estimates the initial amplitudes of the signals at each sample, and determines whether or not the second part of the scan is needed. For example, the Lomb estimator 730 may determine whether or not the signal amplitude in one or more regions of a produced spectrum exceeds a predetermined threshold, such that the second part of the scan should be performed over that spectral region, as discussed above. The Lomb estimator may provide a signal 735 to the scan controller 710 to direct the scan controller to implement the second part of the scan.

The scan controller provides a control signal 745 to the Lomb estimator, which may include positional information received via position signal 720 if the system is implementing knowledge-based processing, as discussed above (e.g., step 214).

The scan controller 710 may be configured to receive a user input 740 that defines the predetermined threshold. The threshold level may then be communicated to the Lomb estimator 730 from the scan controller 710 as part of the control signal 745. The user input may specify additional information, such as a desired spectral resolution, sample spacing, etc. Based on the user input, the scan controller 710 may select the OPD and sample spacing to achieve the specified spectral resolution, and send the appropriate control signals 715, 725 for each step of the scan. In certain examples, the scan controller 710 may adapt each step of the scan to ensure a desired average sample spacing A is realized (which may be specified in the user input 740, for example), and may also assign a computation grid to the Lomb estimator 730 (in signal 745) to provide the desired resolution. The Lomb estimator 730 outputs the measured spectra from the first and second parts of the scan. The spectra may be viewed or analyzed by a user, or by another computer system, for example.

Optionally the system 700 may include an instrument line shape computer 750. As discussed above, the ILS is defines the band shape and band center of each spectral element, and is the spectral equivalent of a point spread function for the interferometer 410. The instrument line shape computer 750 may receive a signal 755 from the scan controller 710 which specifies positional information (e.g., derived from signal 720), the OPD, sample spacing, and/or the assigned frequency grid for processing. The instrument line shape computer 750 may produce the ILS based on the information received from the scan controller 710 in signal 755. In certain embodiments, the system 700 may include convolution computer 760 coupled to the instrument line shape computer 750. The system 700 may also include a reference spectra database 540 that contains a library of spectra corresponding to known compounds. The convolution computer may convolve the ILS received from the instrument line shape computer 750 with one or more reference spectra from the database 540 to produce predicted "as measured" reference spectra 765. An analyzer 770 may be used to compare the predicted reference spectra 765 with the spectra from the Lomb estimator 730 to determine whether or not the spectra indicate that a particular compound is present in the scene measured by the interferometer 410.

The function and advantages of various embodiments will be more fully understood from the following non-limiting examples. These examples are intended to be illustrative in nature and are not to be considered as limiting the scope of the embodiments discussed herein. In the following examples, simulated interferograms were produced with two closely spaced line sources, corresponding to sinusoids at 37 cm$^{-1}$ and 37.25 cm$^{-1}$. These examples compare the uniform sampling of OPD commonly used in conventional FTSs with the "hybrid" combination of linear and incrementally spaced sampling, and other features, of embodiments disclosed herein.

Figure 8A:
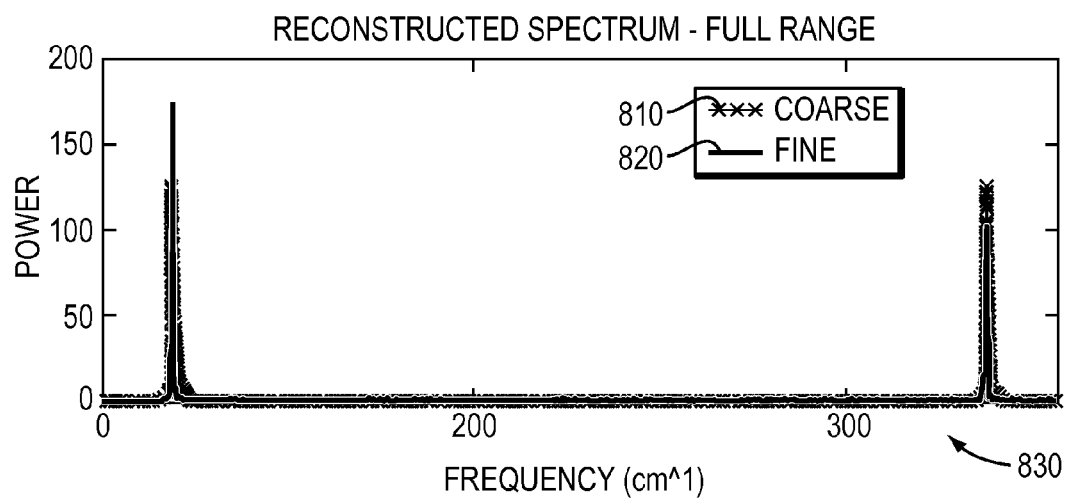
FIG. 8A is an illustration of a reconstructed spectrum obtained from a simulation of a two-part scan.
Figure 8B:
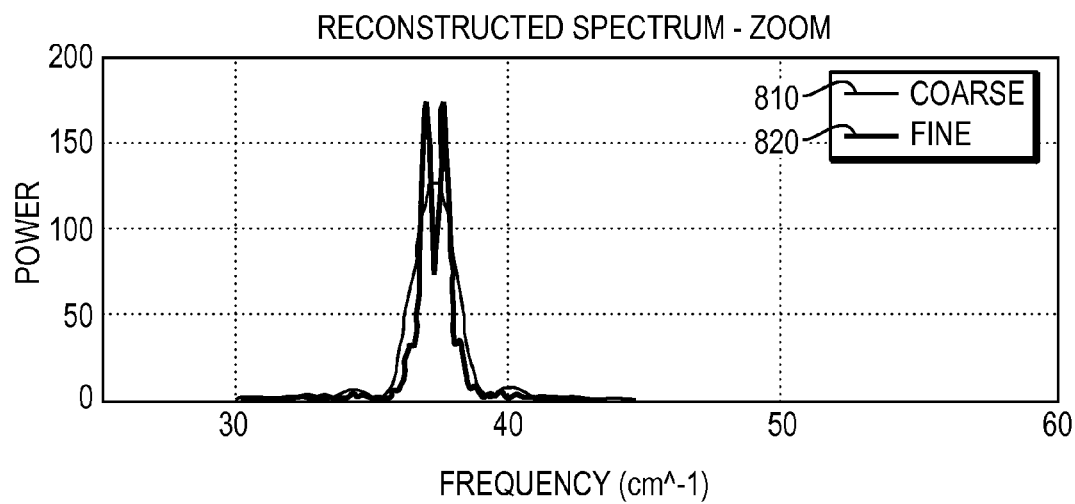
FIG. 8B is an illustration of a "zoomed" portion of the reconstructed spectrum of FIG. 8A.

For comparison, a first simulation was done using a two part scan in which conventional linear (uniformly spaced) sampling was used for both parts. This simulation used 512 total samples (256 samples in each part), with the first part of the scan using the traditional Nyquist sampling spacing and the second part of the scan using an increased sample interval in order to obtain 4X OPD. Thus, for the first part of the scan, the OPD=0.5 cm, and the spectral sampling spacing=0.5/256 cm. For the second part of the scan, the OPD=2 cm, and the spectral sampling spacing=2/256 cm. FIGS. 8A and 8B illustrate the results obtained from this simulation. FIG. 8A shows the reconstructed spectrum, and FIG. 8B shows a "zoomed" portion of the reconstructed spectrum around the signals of interest. In both FIGS. 8A and 8B, trace 810 corresponds to the first part of the scan, and trace 820 corresponds to the second part of the scan. As shown in FIG. 8B, the smaller sample spacing and lengthened OPD of the second part of the scan provide enhanced resolution. However, as may be seen with reference to FIG. 8A, this dual uniform sampling approach results in aliasing (false signal at 830) which cannot be resolved and therefore may cause false detection.

Figure 9:
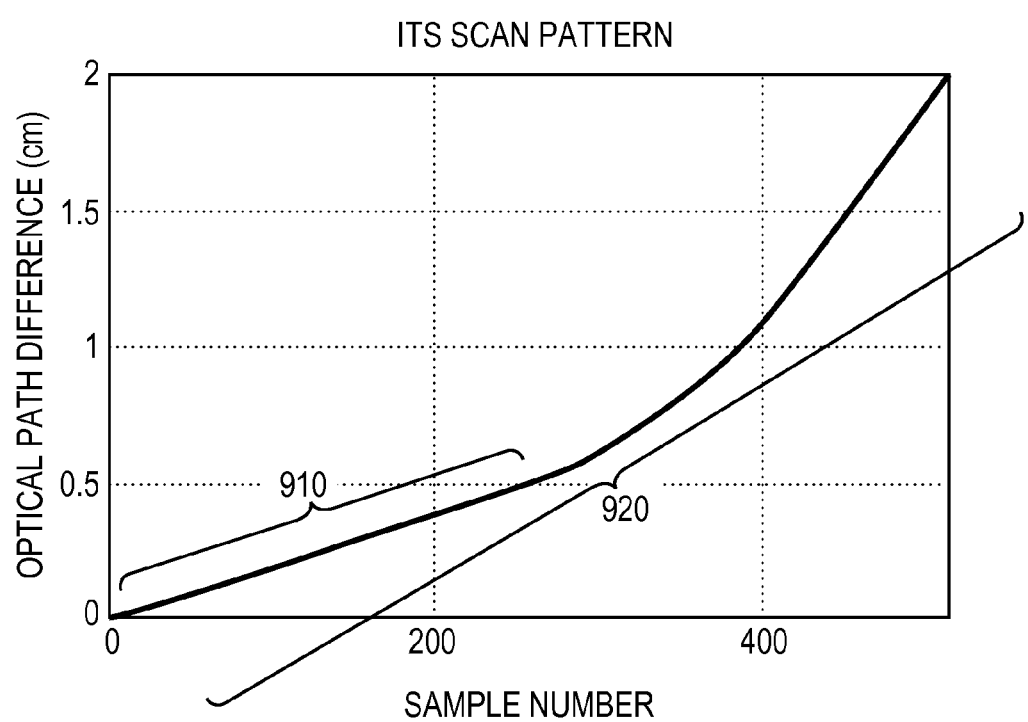
FIG. 9 is a graph of an interferometric transform spectrometer (ITS) scan pattern used for simulations discussed herein.
Figure 10A:
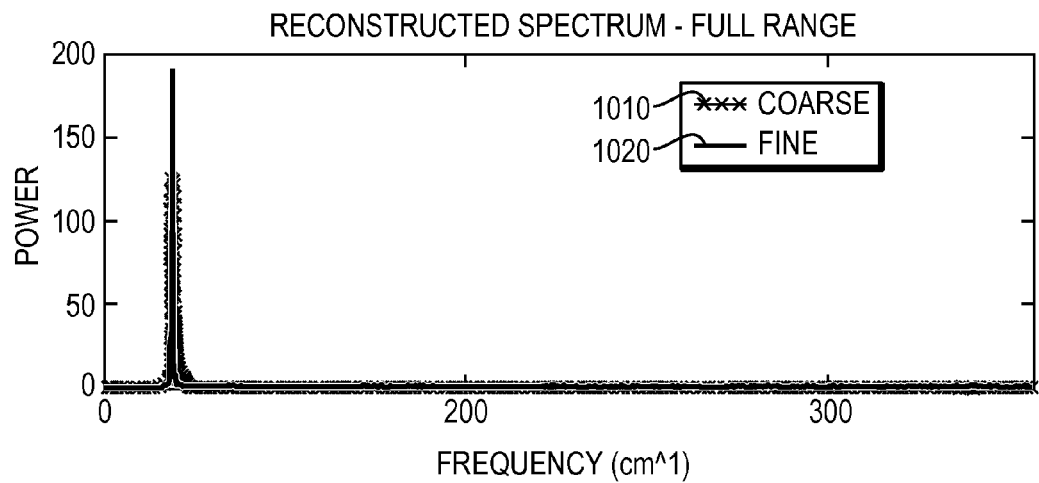
FIG. 10A is an illustration of a reconstructed spectrum obtained from another simulation of a two-part scan.
Figure 10B:
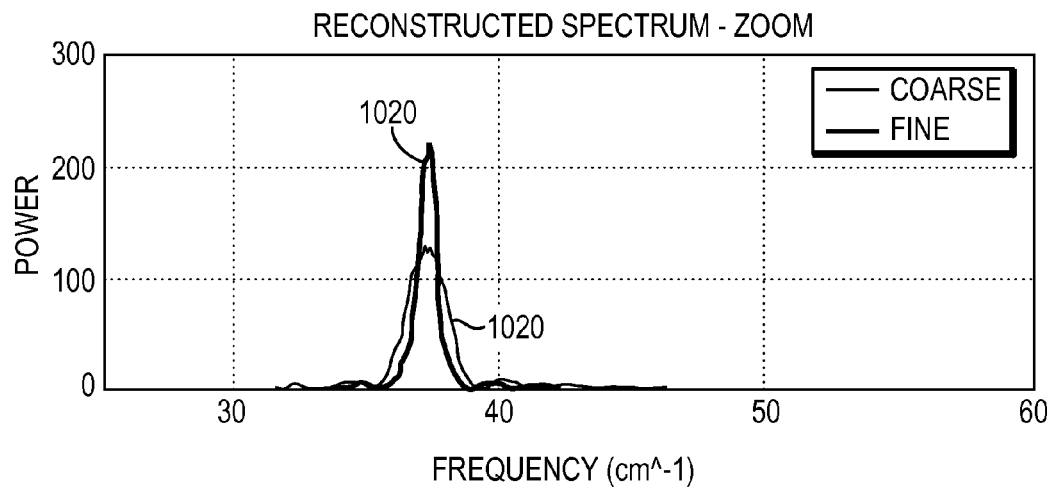
FIG. 10B is an illustration of a "zoomed" region of the spectrum of FIG. 10A.

Referring to FIG. 9, there is illustrated a graph of the interferometric transform spectrometer (ITS) scan pattern used for the following simulations. The graph shows the OPD as a function of the sample number. In a first simulation, 512 total samples were taken, with the first part of the scan 210 using approximately linearly spaced (uniformly spaced) samples, and the second part of the scan 250 using incrementally spaced samples to achieve 4X OPD. For the first part of the scan, corresponding to "coarse" resolution and part 810 of the ITS scan pattern shown in FIG. 8, the OPD=0.5 cm, and the spectral sampling=0.5/256 cm (similar to the example discussed above). For the second part of the scan, corresponding to "fine" resolution and part 820 of the ITS scan pattern shown in FIG. 8, the OPD=2 cm, and the spectral sampling average=2/256 cm. However, unlike the previous example, in this simulation, incremental sample spacing, rather than linear sample spacing was used. FIGS. 10A and 10B illustrate the results obtained from this simulation. FIG. 10A illustrates the reconstructed full spectrum obtained from each of the first part of the scan 1010 and the second part of the scan 1020. FIG. 10B shows a "zoomed" region of the spectrum around the signals of interest. The "fine" resolution obtained with the second part of the scan 1020 has 4X resolution compared to the "coarse" resolution of the first part of the scan 1010. As may be seen with reference to FIG. 10A, in contrast to the dual uniform sampling approach of the previous example, in this simulation, there is no aliasing. Thus, enhanced spectral resolution, e.g., >2X, may be obtained without the disadvantages associated with aliasing.

Figure 11A:
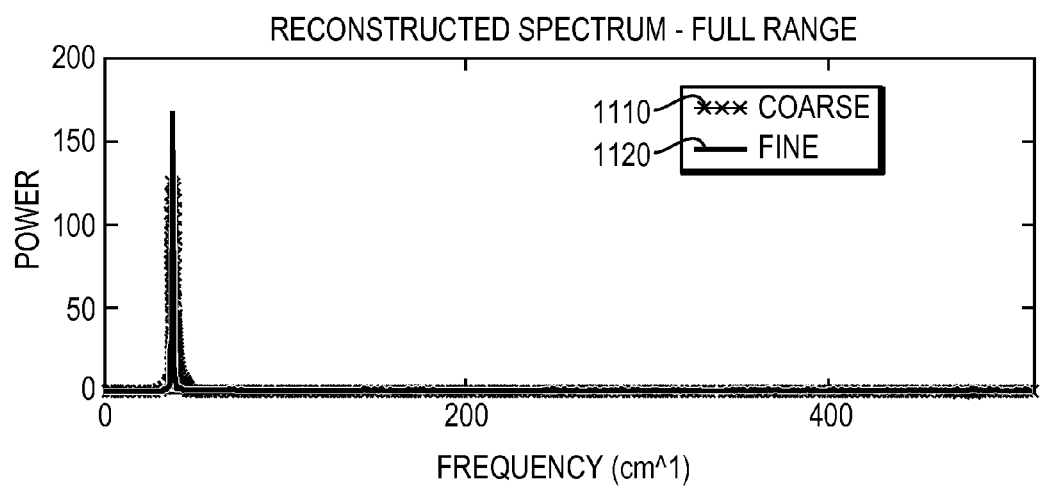
FIG. 11A is an illustration of a reconstructed spectrum obtained from another simulation of a two-part scan.
Figure 11B:
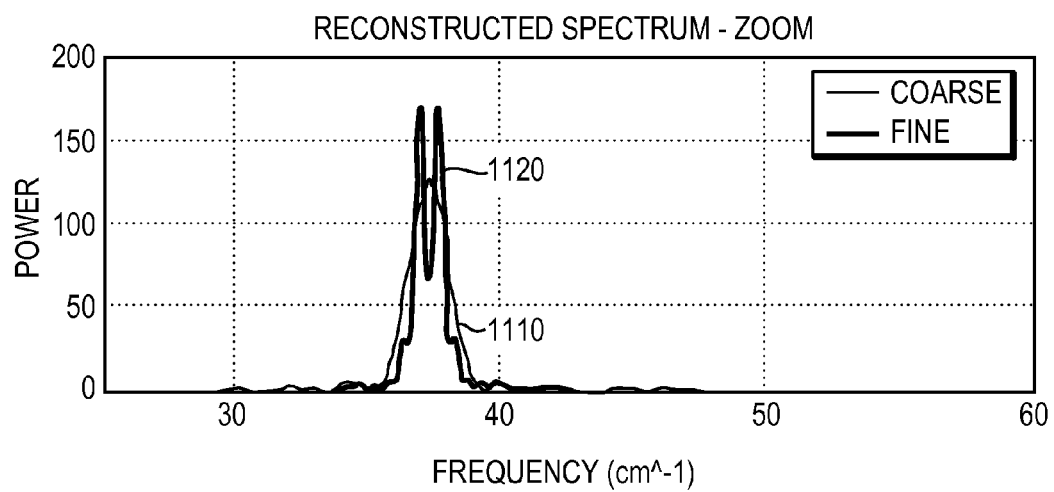
FIG. 11B is an illustration of a "zoomed" region of the spectrum of FIG. 11A.

Another simulation was performed to demonstrate that even further enhanced spectral resolution may be obtained without aliasing using the two-part scan and incremental sampling approach discussed above according to certain embodiments. In this simulation, 512 total samples were taken. For the first part of the scan, the samples were linearly spaced with the OPD=0.5 cm and the spectral sampling spacing=0.5/256 cm, as was the case in the two examples discussed above. The second part of the scan used incrementally spaced samples to achieve 8X the OPD, with the OPD=4 cm and an average spectral sample spacing=4/256 cm. FIGS. 11A and 11B illustrate the results obtained from this simulation. FIG. 11A illustrates the reconstructed full spectrum obtained from each of the first part of the scan (trace 1110) and the second part of the scan (trace 1120). FIG. 11B shows a "zoomed" region of the spectrum around the signals of interest. The "fine" resolution obtained with the second part of the scan 1120 has 8X resolution compared to the "coarse" resolution of the first part of the scan 1110. Again, the enhanced spectral resolution may be obtained without aliasing. The spectral reconstruction of the first part of the scan may be used to limit the wavelengths that are reconstructed using the second part of the scan or reconstructed using the concatenated scan.

Thus, aspects and embodiments provide a "hybrid" scan approach in which conventional linear scan (uniform or close to uniform sample spacing) is used during the first part of the scan to obtain spectra with coarse resolution, followed by an extended incremental scan with incrementally spaced samples to achieve fine resolution over at least a portion of the initially sampled spectral range. The first part of the scan may be used to identify real signals (i.e., avoid any artifacts), and the relatively coarse resolution may be sufficient. The second part of the scan may be used to obtain enhanced spectral resolution and reconstruction may be applied only in spectral locations where the first part of the scan identified signals of interest. Conventional FFT-based processing may be used for the first part of the scan if uniform sample spacing is used, and the frequency range of interest is below the traditional Nyquist limit, as discussed above. Alternatively, knowledge-based processing may be used. If no signals of interest are detected when the spectra obtained from the first part of the scan are analyzed, the system may be programmed to forego the second part of the scan, and instead perform the first part of the scan over a different spatial scene region. Aspects and embodiments may provide superior spectral resolution compared to conventional systems, for a given number of samples or observation time. For example, as discussed above, certain embodiments may provide at least twice the spectral resolution of conventional systems for a given number of samples. In another example, as also discussed above, at least twice the spectral resolution of conventional systems may be achieved for a given amount of observation time.

Figure 12:
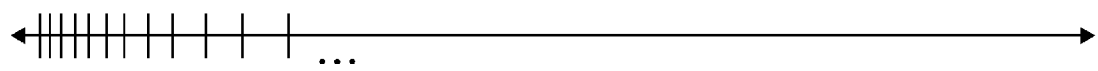
FIG. 12 is a diagram an example of notional incremental sampling spacing, according to aspects of the invention.

The above-discussed embodiments focus on the implementation of a two-part scan. According to another embodiment, an ITS may be configured to only employ non-uniform (incremental) sampling. FIG. 12 illustrates an example of notional pure incremental sampling spacing. Such embodiments may provide enhanced spectral resolution, but may introduce noise or spurious signals (artifacts). Accordingly, it may be preferable to use such embodiments when scanning for a particular known substance having a known spectral signature, as the impact of sampling artifacts may be minimal in such applications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An interferometric transform spectrometer system comprising:
   a Michelson interferometer configured to introduce a varying optical path length difference (OPD) between two arms of the Michelson interferometer so as to produce an interferogram;
   a detector positioned at a focal plane of the Michelson interferometer and configured to receive and sample the interferogram; and
   a scan controller coupled to the detector and to Michelson interferometer and configured to control the Michelson interferometer to vary the OPD in discrete steps such that the detector provides, for each of a first and second scan segment, M samples of the interferogram, wherein for the first scan segment, the M samples have a uniform or non-uniform sample spacing and the OPD has a first maximum value, and for the second scan segment, the M samples have an incrementally increasing sample spacing and the OPD has a second maximum value that is at least twice the first maximum value.

2. The interferometric transform spectrometer system of claim 1, further comprising a Lomb estimator coupled to the scan controller and to the detector, the Lomb estimator configured to receive and process, for each of the first and second scan segments, the M samples from the detector.

3. The interferometric transform spectrometer system of claim 2, wherein the Lomb estimator is configured to estimate a signal amplitude for each of a plurality of cosinusoids that are fit to the M samples from the first scan segment, and to provide a control signal to the scan controller to direct the scan controller to begin the second scan segment responsive to the signal amplitude of at least one cosinusoid being above a threshold value.

4. The interferometric transform spectrometer of claim 3, wherein the scan controller is configured to receive information containing the threshold value from a user of the system, and to provide a signal specifying the threshold value to the Lomb estimator.

5. The interferometric transform spectrometer system of claim 3, wherein the control signal provided from the Lomb estimator to the scan controller further specifies a frequency range to be reconstructed from the M samples collected during the second scan segment, the frequency range including a frequency associated with at least one reconstructed signal derived from the first scan segment.

6. The interferometric transform spectrometer system of claim 1, wherein the Michelson interferometer includes:
a fixed minor positioned in a first arm of the two arms;
a movable minor in a second arm of the two arms;
a beamsplitter configured to split and direct incident radiation into the two arms, and to recombine reflected radiation from the two arms and provide reflected radiation to the detector; and
an actuator coupled to the movable mirror and to the scan controller, and configured to move the movable mirror along an axis of the second arm so as to produce the varying OPD responsive to an actuation signal from the scan controller.

7. A method of spectral imaging using an interferometric transform spectrometer (ITS) comprising:
controlling the ITS to collect M first samples of an interferogram produced by the ITS over a first frequency range and first optical path difference of the ITS, M being a positive integer;
processing at least some of the M first samples to produce corresponding first spectra;
analyzing the first spectra to determine a presence or absence of a signal of interest;
responsive to detecting the signal of interest, controlling the ITS to collect M second samples of the interferogram over a second optical path difference of the ITS, the M second samples having an incrementally increasing sample spacing; and
processing the M second samples to produce corresponding second spectra.

8. The method of claim 7, wherein the M first samples have a uniform sample spacing.

9. The method of claim 8, wherein the ITS includes a Michelson interferometer, and wherein controlling the ITS to collect the M first samples includes controlling the Michelson interferometer to vary the optical path difference between two arms of the Michelson interferometer in uniform steps.

10. The method of claim 9, wherein processing at least some of the M first samples includes applying DFT/FFT processing to the M first samples to produce the first spectra.

11. The method of claim 8, wherein controlling the ITS to collect the M first samples includes varying the optical path difference between the two arms of the Michelson interferometer over a first range from a minimum optical path difference value to a first maximum optical path difference value; and
wherein controlling the ITS to collect the M second samples includes controlling the Michelson interferometer to vary the optical path difference between the two arms of the Michelson in incrementally increasing steps over a second range from the minimum optical path difference value to a second maximum optical path difference value, the second maximum optical path difference value being at least twice the first maximum optical path difference value.

12. The method of claim 11, wherein the second maximum optical path difference value is approximately four times the first maximum optical path difference value.

13. The method of claim 7, wherein the first M samples have a non-uniform sample spacing.

14. The method of claim 13, wherein the ITS includes a Michelson interferometer having a movable minor configured to provide a varying optical path difference between two arms of the Michelson interferometer;
wherein controlling the ITS to collect the M first samples includes moving the movable mirror along an axis of a respective arm of the Michelson interferometer; and
wherein processing at least some of the M first samples includes determining a position of the movable mirror, and performing a series of cosine estimations on the at least some of the M first samples, using knowledge of the position of the movable minor, to estimate a signal amplitude fit to at least some of the M samples.

15. The method of claim 14, wherein controlling the ITS to collect the M first samples includes varying the optical path difference between the two arms of the Michelson interferometer over a first range from a minimum optical path difference value to a first maximum optical path difference value; and
wherein controlling the ITS to collect the M second samples includes controlling the Michelson interferometer to vary the optical path difference between the two arms of the Michelson in incrementally increasing steps over a second range from the minimum optical path difference value to a second maximum optical path difference value, the second maximum optical path difference value being at least twice the first maximum optical path difference value.

16. The method of claim 15, wherein the second maximum optical path difference value is approximately four times the first maximum optical path difference value.

17. The method of claim 7, wherein processing at least some of the M first samples includes using a Lomb estimator to estimate initial signal amplitudes of each of a plurality of cosinusoids that are fit to the M first samples, and wherein analyzing the first spectra includes determining whether the signal amplitude of at least one of the cosinusoids exceeds a threshold value.

* * * * *

UNITED STATES PATENT AND TRADEMARK OFFICE
CERTIFICATE OF CORRECTION

PATENT NO. : 9,279,724 B2  
APPLICATION NO. : 14/312740  
DATED : March 8, 2016  
INVENTOR(S) : Ian S. Robinson et al.

Page 1 of 1

It is certified that error appears in the above-identified patent and that said Letters Patent is hereby corrected as shown below:

In the Specification:
At column 1, line number 12, delete "minor" and replace with --mirror--.
At column 2, line number 32, delete "minor" and replace with --mirror--.
At column 2, line number 33, delete "minor" and replace with --mirror--.
At column 3, line number 9, delete "minor" and replace with --mirror--.
At column 3, line number 12, delete "minor" and replace with --mirror--.
At column 3, line number 19, delete "minor" and replace with --mirror--.
At column 5, line number 29, delete "minor" and replace with --mirror--.
At column 5, line number 35, delete "minor" and replace with --mirror--.
At column 7, line number 39, delete "minor" and replace with --mirror--.
At column 9, line number 43, delete "minor" and replace with --mirror--.
At column 9, line number 51, delete "minor" and replace with --mirror--.

In the Claims:
At column 13, line number 32, claim number 6, delete "minor" and replace with --mirror--.
At column 13, line number 33, claim number 6, delete "minor" and replace with --mirror--.
At column 14, line number 27, claim number 14, delete "minor" and replace with --mirror--.
At column 14, line number 37, claim number 14, delete "minor" and replace with --mirror--.

Signed and Sealed this  
Nineteenth Day of July, 2016

Michelle K. Lee  
*Director of the United States Patent and Trademark Office*